United States Patent
Bolla et al.

(10) Patent No.: US 10,853,803 B2
(45) Date of Patent: Dec. 1, 2020

(54) PAYMENT LINK DETECTION AND USER REDIRECTION ON SOCIAL MEDIA

(71) Applicant: PAYPAL, INC., San Jose, CA (US)

(72) Inventors: Raja Ashok Bolla, Austin, TX (US); Hari Kiran Vuyyuru, Austin, TX (US); Arun Chandrasekaran, Austin, TX (US); Naresh Kumar Yoganandam, Austin, TX (US); Venkata Naga Sai Ranga Rao Chadalawada, Austin, TX (US)

(73) Assignee: PayPal, Inc., San Jose, CA (US)

( * ) Notice: Subject to any disclaimer, the term of this patent is extended or adjusted under 35 U.S.C. 154(b) by 335 days.

(21) Appl. No.: 15/802,303

(22) Filed: Nov. 2, 2017

(65) Prior Publication Data

US 2019/0130463 A1    May 2, 2019

(51) Int. Cl.
| | |
|---|---|
| *G06Q 20/38* | (2012.01) |
| *G06Q 50/00* | (2012.01) |
| *G06F 16/951* | (2019.01) |
| *G06Q 30/00* | (2012.01) |
| *G06Q 30/06* | (2012.01) |

(52) U.S. Cl.
CPC ......... *G06Q 20/384* (2020.05); *G06F 16/951* (2019.01); *G06Q 20/382* (2013.01); *G06Q 30/016* (2013.01); *G06Q 30/0613* (2013.01); *G06Q 50/01* (2013.01)

(58) Field of Classification Search
CPC .................. G06Q 30/0601–0643; G06Q 50/01
See application file for complete search history.

(56) References Cited

U.S. PATENT DOCUMENTS

| | | | |
|---|---|---|---|
| 8,949,981 B1* | 2/2015 | Trollope | H04L 67/306 726/22 |
| 10,223,353 B1* | 3/2019 | Labarre | G06Q 30/0631 |
| 2013/0325550 A1* | 12/2013 | Varghese | H04W 4/21 705/7.31 |

(Continued)

OTHER PUBLICATIONS

Techniques to Detect Spammers in Twitter—Survey. International Journal of Computer Applications (0975-8887) vol. 85—No. 10, Jan. 2014 (Year: 2014).*

(Continued)

*Primary Examiner* — William J Allen
(74) *Attorney, Agent, or Firm* — Haynes and Boone LLP

(57) ABSTRACT

Methods and systems for managing a public perspective of an entity by analyzing online posts and automatically performing actions in response to these online posts are described herein. Real-time feeds of online posts may be streamed from social media servers. Online posts that are determined to be related to the entity may be extracted from the feeds and accumulated for analysis. A sentiment analysis may be performed on the online posts to determine the public perspective toward the entity. Content of the online posts may be analyzed to determine whether it is related to a prohibited transaction or an inquiry for a product or a service offered by the entity. Actions may be automatically performed to prevent the prohibited transaction from occurring. Resources related to the product or the service may be offered in response to the online post.

20 Claims, 7 Drawing Sheets

(56) References Cited

U.S. PATENT DOCUMENTS

| | | | | |
|---|---|---|---|---|
| 2014/0108152 A1* | 4/2014 | Wu | G06Q 10/10 | |
| | | | 705/14.66 | |
| 2014/0108184 A1* | 4/2014 | Herbette | G06Q 50/01 | |
| | | | 705/26.4 | |
| 2014/0207561 A1* | 7/2014 | Dandekar | G06Q 30/0242 | |
| | | | 705/14.41 | |
| 2014/0278815 A1* | 9/2014 | Grant | G06Q 10/06393 | |
| | | | 705/7.36 | |
| 2016/0036828 A1* | 2/2016 | Hughes | H04L 63/123 | |
| | | | 726/26 | |
| 2016/0117591 A1* | 4/2016 | Naik | G06N 5/025 | |
| | | | 707/748 | |
| 2016/0283975 A1* | 9/2016 | Kaul | G06Q 50/01 | |
| 2016/0344828 A1* | 11/2016 | Hausler | H04L 67/42 | |
| 2017/0148036 A1* | 5/2017 | Klemm | G06Q 30/0201 | |
| 2017/0244746 A1* | 8/2017 | Hawthorn | H04L 63/1408 | |
| 2018/0308125 A1* | 10/2018 | Avegliano | G06Q 30/0255 | |

OTHER PUBLICATIONS

Spam Detection in Social Media Employing Machine Learning Tool for Text Mining. 2017 13th International Conference on Signal-Image Technology and Internet-Based Systems (Year: 2017).*

* cited by examiner

PAYMENT LINK DETECTION AND USER REDIRECTION ON SOCIAL MEDIA

BACKGROUND

The present specification generally relates to management of a public perspective of an entity, and more specifically to automatically performing actions based on advanced analysis of social media posts to manage the public perspective of the entity.

RELATED ART

Social media has become a popular outlet for many people to express themselves. Typically, users of the social media platforms may use the platform to express their view points, their attitudes, or their questions within their communities on social media. Many of their view points, attitudes, or questions are directed toward a particular brand, an entity behind the particular brand, or a particular product or service. For example, they may express their opinions about a certain brand or product (e.g., whether they like it or not, how does the particular product compared to other similar products, etc.) and/or they may post their questions or frustrations related to using a certain product or service. It has even been observed that people feel more comfortable about expressing themselves on social media than directly communicating with various companies. For example, instead of sending an e-mail or calling a hotline of a company to ask for help, a user of a product may opt to post the question regarding the product on a social media platform. Friends of the user within the social media community may offer help or may share the same frustration about the product with the user. Furthermore, potential transactions using a company's product or service that are in violation of the company's policy (and may also be illegal) may be advertised on social media. The accumulation of these social media posts related to the product may easily influence the public's perspective or perception toward the product and the company that provides the product.

As such, it is no longer sufficient for companies today to solely rely on using their hotlines, websites, and/or surveys to provide after sales services to users and capture sentiment from the public. Furthermore, the companies need to take a proactive stance toward managing their brands within different social media platforms. Thus, there is a need for systems and methods that provide analysis of social media in real time in order to serve users and manage public sentiment of a brand.

Figure 1:
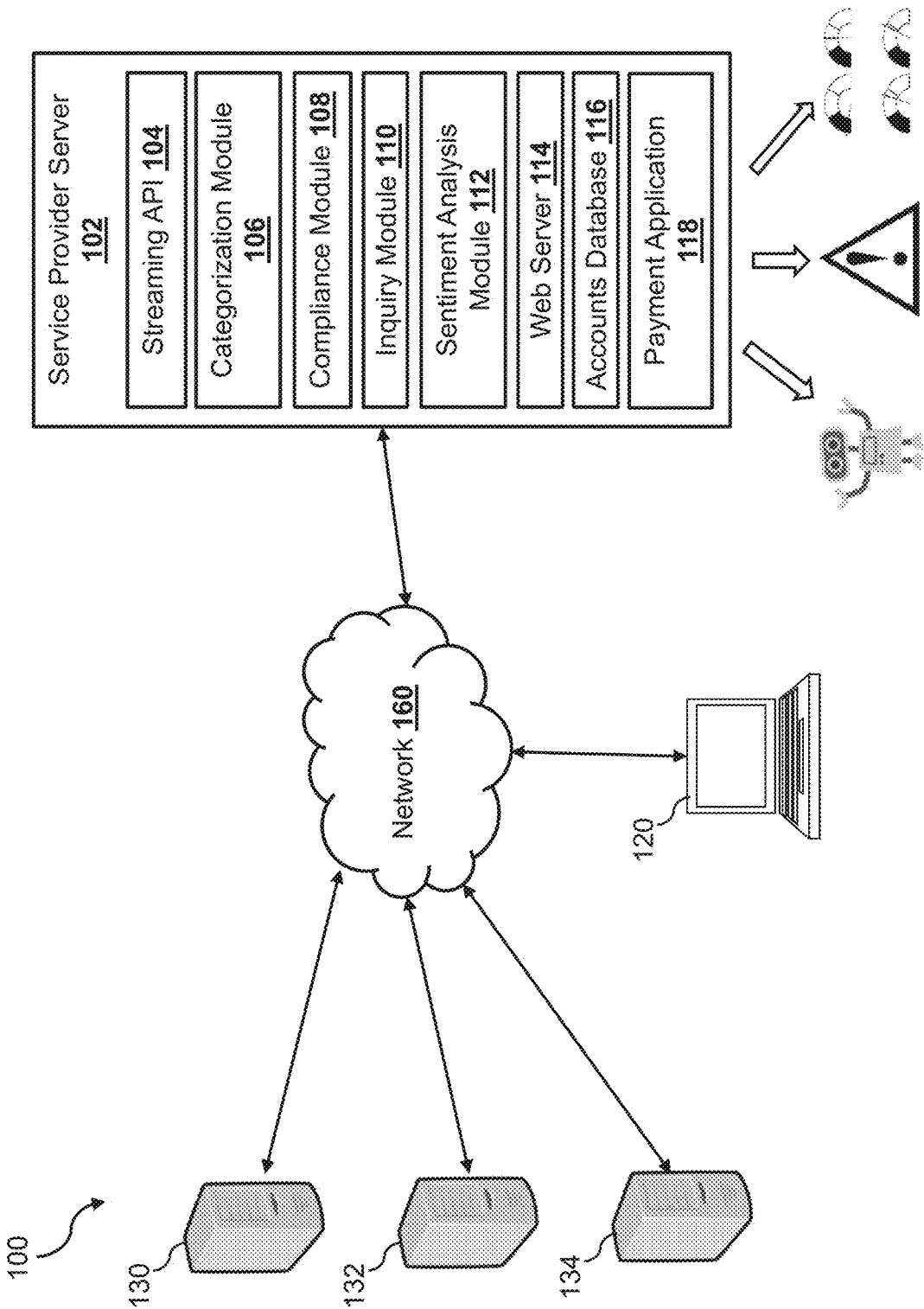
FIG. 1 is a block diagram illustrating a social media analysis system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for managing a public perspective of an entity by analyzing online posts related to an entity and automatically performing actions in response to these online posts. The entity may be a person, a company, or any type of organization for which someone may submit a public post about. Real-time feeds may be streamed from one or more social media servers, for example, by using a streaming application programming interface. Online posts that are determined to be related to the entity may be extracted from the feeds and accumulated for analysis. Each online post related to the entity may be analyzed to first determine a category, selected from multiple categories, associated with the post. The categories may include, but not limited to, a compliance category, an inquiry category, and an opinion category.

In some embodiments, in order to determine a category for the online post, content from the online post may be analyzed. For example, text from the online post may be parsed and semantics of the text may be analyzed to determine whether the online post is related to a question, a potential transaction, or just a statement. In some embodiments, when the online post includes image data, image recognition and/or optical character recognition may be used to extract content from the image data. When the online post is determined to be related to a potential transaction, the online post may be assigned to the compliance category. When the online post is determined to include a question, the online post may be assigned to the inquiry category. Furthermore, when the online post is determined to be just a statement about the entity (or a product or a service offered by the entity), the online post may be assigned to the opinion category.

Once the online post is categorized, the content of the online post may be further analyzed to determine an action to be performed in response to the online post. For example, when the online post is assigned to the compliance category, the content of the online post may be analyzed to determine whether the potential transaction discussed in the online post is a transaction that is in violation of the policies of the entity. A keyword search may be performed on the content (or content extracted from the image or video in the online post) to determine if the online post includes one or more keywords that indicate a violation of the entity's policies. If it is determined that the online post is related to a potential transaction in violation of the entity's policies, a take-down request of a listing of the item or service associated with the potential transaction may be automatically generated and transmitted to the social media server from which the online post is retrieved. Furthermore, the online post may be examined to determine a user account with the entity (the seller account) associated with the poster of the online post, based on a user name (handle name) of the poster on the social media platform. One or more restrictions may then be applied to the seller account. For example, the seller account may be deactivated for a predetermined duration of time. In another example, a maximum transaction limit may be placed on the seller account for a predetermined duration of time.

In some embodiments, the online post may also be examined to determine whether the online post includes a link to a website associated with the entity for facilitating the transaction. For example, the link may be specifically associated with the seller account in order for the seller to perform the transaction advertised in the online post. In such embodiments, a web server of the entity may be automatically configured to re-direct the link to another website, for example, to a website that notifies viewers that the desired transaction is prohibited as it is in violation of the entity's policies.

In some embodiments, the online post may also be examined to determine a user account with the entity (the buyer account) associated with a potential buyer. For example, users who responded to (or provided comments to) the online post may be tracked based on their user names (handle names) with the social media platform. When the online post includes a link to a website associated with the entity, users who attempt to view the website via the link included in the online post may also be tracked. Once a buyer account is identified, one or more restrictions may be applied to the buyer account. As with the seller account, the buyer account may be deactivated for a predetermined duration of time. In another example, a maximum transaction limit may be placed on the buyer account for a predetermined duration of time. In some embodiments, the restrictions placed on the seller account are more restrictive than the restrictions placed on the buyer account.

When the online post is assigned to the inquiry category, the content of the online post may be analyzed to identify a product or a service related to the question in the online post. A keyword search may be performed to determine whether the online post includes one or more keywords related to products and/or services offered by the entity. Once the product or service is identified, a response may be automatically generated and posted on the social media server in response to the online post. In some embodiments, the response may include a link to a website associated with the product or service (e.g., a frequently asked question page for the identified product or service). Furthermore, an instance of a bot may be instantiated for interacting with this online post (e.g., for communicating with the poster of the online post on the social media). The bot may use one or more machine learning algorithms to understand a context of the online post and any follow-up posts generated by the poster, and to generate proper responses to the poster.

In some embodiments, a sentiment analysis may be performed on the original online post and the follow-up posts generated by the poster to determine a sentiment and/or a sentiment trend of the poster throughout the interactions. The sentiment trend may then be used to assist the bot in providing the follow-up responses to the posts generated by the poster. For example, if the sentiment trend (e.g., a change of the sentiment) of the poster is trending toward positive, the bot may continue to use the same approach in responding to the poster. However, if the sentiment trend of the poster is trending toward negative, the bot may determine to change an approach to respond to the poster. For example, the bot may notify a human customer service representative to assist with the poster (e.g., by transmitting a notification to a user device associated with a human customer service representative).

In some embodiments, online posts that are assigned to the opinion category are accumulated and analyzed. Content of the accumulated online posts may be analyzed to determine a common topic of the online posts. For example, the common topic may be related to a particular product or service offered by the entity. Alternatively, the common topic may be specifically related to an event associated with the entity, for example, a recent public announcement made by the entity. Semantics of the accumulated online posts that are related to the common topic may then be analyzed to derive an overall sentiment toward the common topic. In some embodiments, a frequency of the online posts that discuss the common topic may be monitored as well. The overall sentiment and the frequency may then be used to generate a sentiment report associated with the common topic.

In some embodiments, a recommendation may be generated based on the derived overall sentiment and the frequency of the online posts. For example, when it is determined that the overall sentiment toward a recent publication from the entity is negative, the recommended action may include removing the publication from the public domain and/or generating a response to the publication. When it is determined that the overall sentiment toward a recently released new product is positive, the recommended action may include scaling up a production of the new product. According to various embodiments of the disclosure, online posts that are related to the common topic may continue to be monitored, and a sentiment trend may be generated based on the continuous monitoring of the online posts. A report indicating the sentiment trend (e.g., a change of the sentiment) related to the common topic may be generated and presented via a display.

FIG. 1 illustrates a system 100 for analyzing social media feeds according to one embodiment of the disclosure. The system 100 includes a service provider server 102 that is communicatively coupled with various social media servers (such as social media servers 130, 132, and 134) and a user device 120 via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the social media servers 130, 132, and 134 is configured to maintain a social media platform. Example social media platforms include Twitter®, Facebook®, Instagram®, and Snapchat®. After a user has registered an account with a social media platform, the user may begin to post online posts and receive feeds of online posts generated by other users (e.g., posts generated by friends of the user) through the social media platform. As such, each social media server is configured to maintain feeds of online posts and facilitate generation and presentation of the online posts. It is noted that while only three social media servers are shown in this figure, the service provider server 102 may be connected with as many (or as few) social media servers via the network 160 as desired to perform the functions described herein.

The service provider server 102, according to some embodiments, may be maintained by an online service provider, such as PayPal, Inc. of San Jose, Calif., which may provide services related to analyzing online posts and generating actions in response to the online posts as described herein. The service provider server 102 may also be configured to process online financial and information transactions on behalf of users. In some embodiments, the service provider server 102 may also be configured to provide access to goods and services (collectively referred to as "items") of a merchant or service provider that are for purchase and may provide a payment service processing for the purchased items. In the examples given here, the service provider server 102 may perform social media analysis for the online service provider (also referred to as the "entity" hereinafter).

According to various embodiments of the disclosure, the service provider server 102 may include a streaming application programming interface (API) module 104, a categorization module 106, a compliance module 108, an inquiry module 110, a sentiment analysis module 112, a web server 114, an accounts database 116, and a payment application 118. The web server 114 is configured to serve web content to users in response to HTTP requests. As such, the web server 114 may store pre-generated web content ready to be served to users. For example, the web server 114 may store a log-in page, and is configured to serve the log-in page to users for logging into user accounts of the users to access various service provided by the service provider server 102. The web server 134 may also include other webpages associated with the different services offered by the service provider server 102, for example a webpage for transferring money from one user account to another user account, a webpage for viewing products and services, webpages for describing different products or services offered by the entity, etc. As a result, a user may access a user account associated with the user and access various services offered by the service provider server 102, by generating HTTP requests directed at the service provider server 102.

The accounts database 116 stores information related to user accounts that were registered with the entity through the service provider server 102. The information of a user account stored in the accounts database 116 may include a user name, a password (or other types of authentication credentials such as fingerprint information), contact information, other personal information of the user, transaction history related to the user account, available funds of the user account, and other user account related information. In some embodiments, the payment application 118 may process transactions, such as payment transactions, with a user account based on the account information associated with the user account stored in the accounts database 116. The service provider server 102 may include other applications and may also be in communication with one or more external databases (not shown), that may provide additional information to be used by the service provider server 102. In some embodiments, the one or more external databases may be databases maintained by third parties, and may include third party account information of users who have user accounts with the service provider server 102.

The streaming API module 104 may include application programming interfaces (APIs) corresponding to one or more social media servers (such as social media servers 130, 132, and 134) for streaming real-time social media feeds from the social media servers 130, 132, 134. Each real-time social media feed may include online posts generated and posted through user accounts with the corresponding social media platform. For example, the streaming API module 104 may stream a real-time social media feed from the social media server 130. The real-time social media feed may include online posts generated and posted through user accounts with the social media server 130 in real time. Real time is defined herein as substantially close to the time that an event occurs (e.g., within the last five seconds, within the last 2seconds, etc.). As such, the streaming API module 104 enables the service provider server 102 to continuously receive online posts almost immediately as new online posts are posted on the social media servers 130, 132, and 134.

According to various embodiments of the disclosure, each online post from the social media feeds is initially examined to determine whether the online post is related to the entity. In some embodiments, a keyword analysis may be performed to determine if the online post includes one or more keywords related to the entity. The one or more keywords may include a business name of the entity, a name of a product or service offered by the entity, and a slogan associated with the entity. In addition, if the online post includes an image, an image recognition algorithm may be used to determine if the image includes the one or more keywords or includes a graphic related to the entity, such as a logo of the entity, an image of a product offered by the entity, etc. Online posts that are determined to be unrelated to the entity may be discarded, and online posts that are determined to be related to the entity may be passed to the categorization module 106.

The categorization module 106 may analyze the content of the online post and assign the online post to one of the many pre-determined categories. As discussed above, the pre-determined categories may include a compliance category, an inquiry category, and an opinion category. Other categories may also be added to the list, as desired by the entity. In some embodiments, if it is determined that the online post is related to a potential transaction using a product and/or a service offered by the entity, the categorization module 106 may assign the online post to the compliance category. The categorization module 106 may determine that the online post is related to a potential transaction using one or more methods. In some embodiments, the categorization module 106 may perform a keyword search in the online post to determine whether the online post includes one or more keywords related to a potential transaction, such as "sale," "buy," sell," "pay," etc., and may assign the online post to the compliance category when any one of the keywords is included in the online post. In some embodiments, the categorization module 106 may also determine whether the online post includes a link to a website associated with the entity for accessing a product or a service offered by the entity, and may assign the online post to the compliance category when the online post includes such a link.

Figure 2:
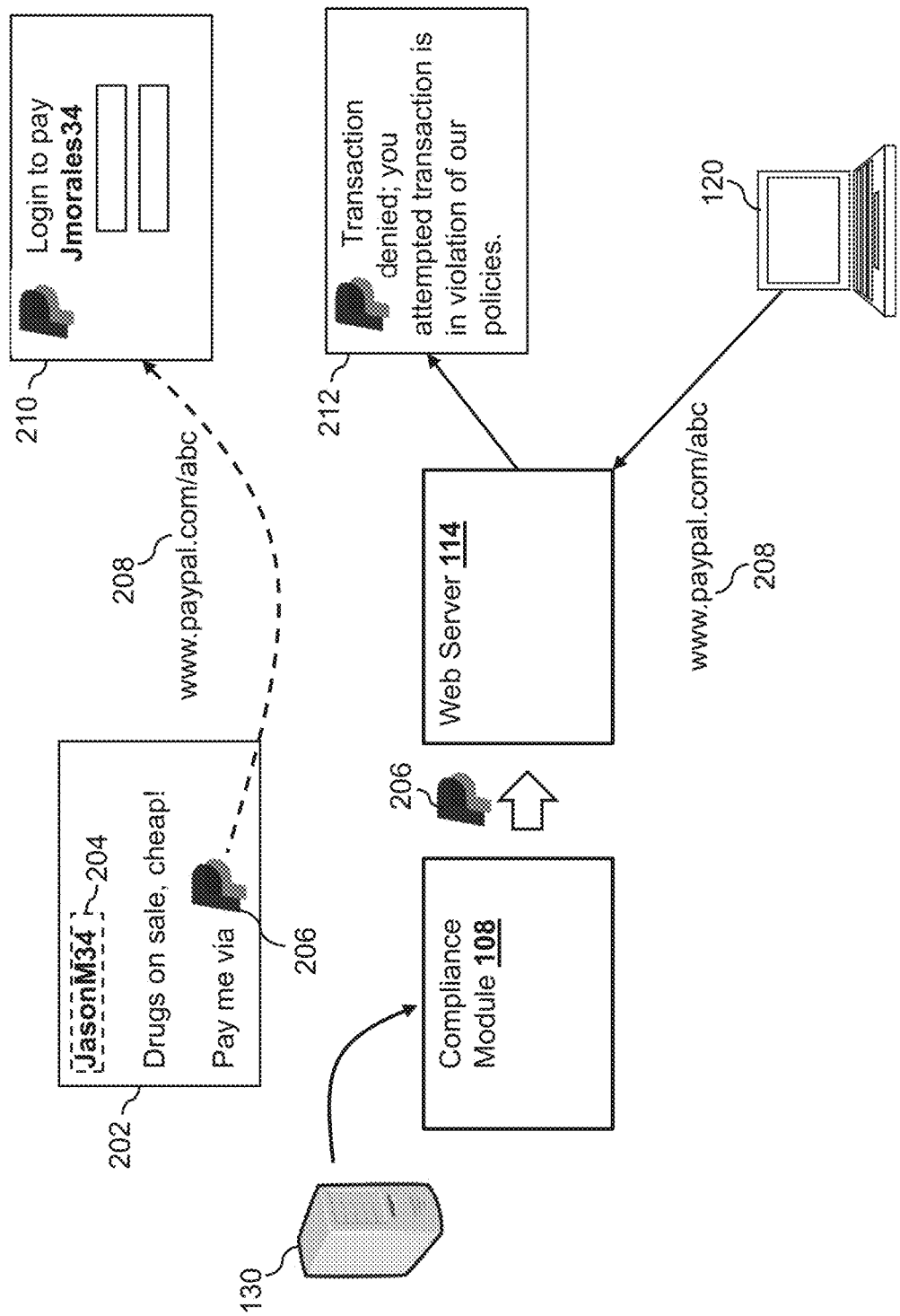
FIG. 2 illustrates analyzing online posts under one approach according to an embodiment of the present disclosure.

FIG. 2 illustrates an example online post 202 retrieved from one of the social media servers 130, 132, and 134. As shown, the online post 202 includes a user name 204 associated with a user registered with the corresponding social media server, text data, and an image 206 that is also a link to a website. Based on a keyword search performed on the text data in the online post 202, the categorization module 106 may determine that keywords related to a potential transaction, such as "sale" and "pay," appear in the online post. Furthermore, the link 206 is directed to a website "www.paypal.com/abc." By analyzing the link, the categorization module 106 may determine that the link is directed to a website associated with the service provider server 102 for making a payment to a user account registered with the service provider server 102. Based on the keyword search performed on the text of the online post and the analysis of the link, the categorization module 106 may determine that the online post is related to a potential transaction using or for one of the products and/or services related to the service provider server 102, and may assign the online post to the compliance category.

In some embodiments, the categorization module 106 may analyze the content of the online post to determine whether the online post is related to an aspect of the entity or to one of the products or services offered by the entity. The categorization module 106 may then assign the online post to the opinion category when it is determined that the online post is related to an aspect of the entity or to one of the products or services offered by the entity. When the online post includes image data, the categorization module 106 may also use an image recognition algorithm to determine whether the image is related to an aspect of the entity or to one of the products or services offered by the entity. For example, the categorization module 106 may analyze the image to determine whether it includes an image of a logo of the entity or an image of a product or service offered by the entity.

Figure 3:
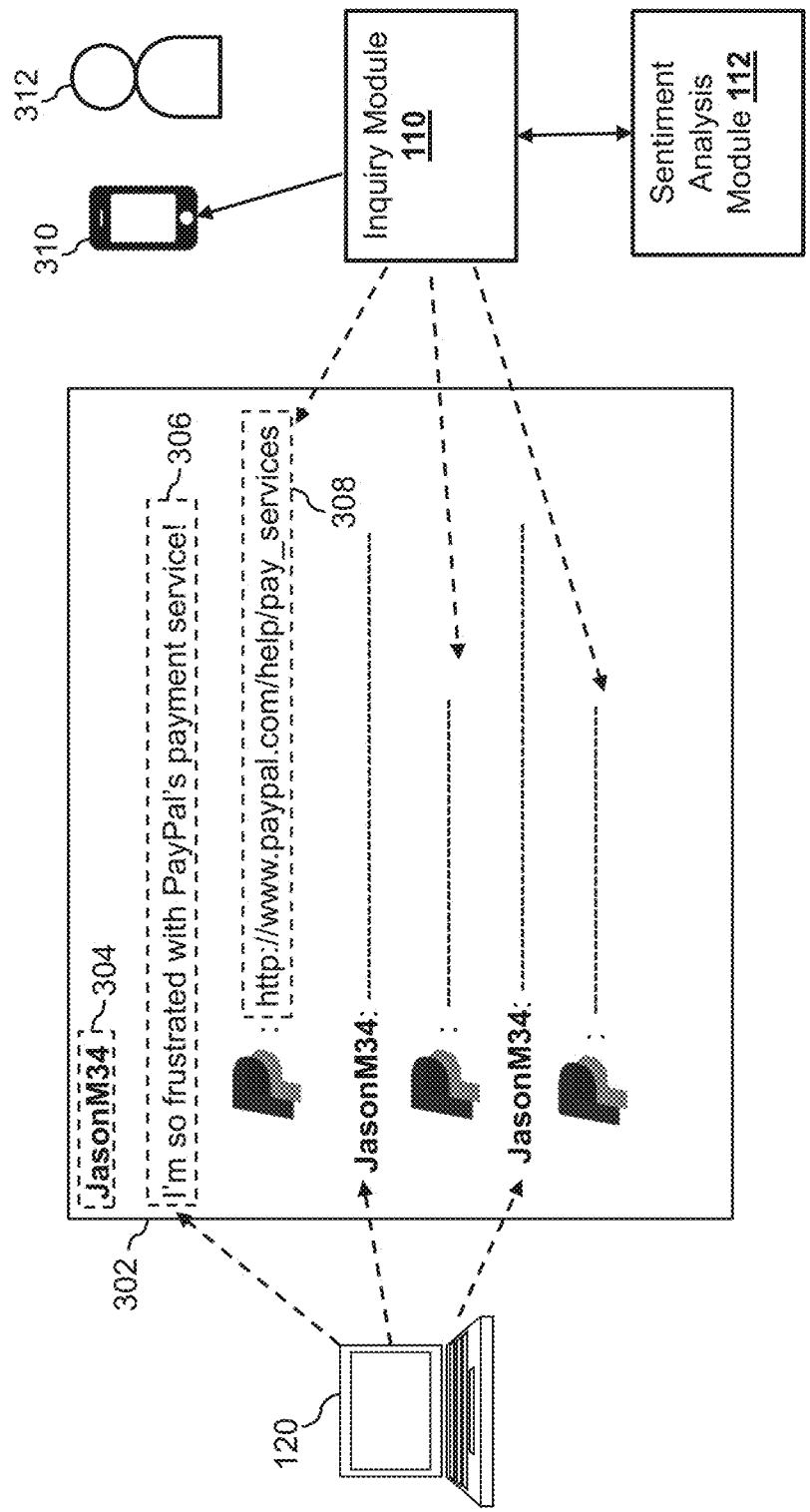
FIG. 3 illustrates analyzing online posts under another approach according to an embodiment of the present disclosure.

FIG. 3 illustrates another example online post 302 retrieved from one of the social media servers 130, 132, and 134. As shown, the online post 302 includes a user name 304 associated with a user who has been registered with the corresponding social media server and text data 306 that was generated and posted by the user 304. By performing a keyword search on the text data 306, the categorization module 106 may determine that the text data 306 includes a name of the entity (e.g., "PayPal") and also a name of the service offered by the entity ("payment service"). Based on this determination, the categorization module 106 may assign the online post 302 to the opinion category.

In some embodiments, the categorization module 106 may also analyze the semantics of the content to determine which category is associated with the online post. For example, if it is determined that the online post includes a question (e.g., by determining that the online post includes a phrase that ends with a question mark or by determining that a phrase is a question based on a semantic or word analysis of the phrase, such as a sentence starting with "why," "what," or "how") or whether the online post indicates a user's frustration with using a product or a service offered by the entity, the categorization module 106 may assign the online post to the inquiry category. Referring back to FIG. 3, the categorization module 106 may perform a semantic analysis on the text data 306 and determine that the text data 306 indicates the user being frustrated with using one of the services offered by the entity, and may then assign the online post 306 to the inquiry category. As shown by this example, it is noted that the categorization module 106 may assign the same online post to multiple categories.

Based on the category or categories that the online post is assigned to, the categorization module 106 may then pass the online post to one or more of the analysis engines, including the compliance module 108, the inquiry module 110, and the sentiment analysis module 112. For example, the categorization module 106 may pass online posts that are assigned to the compliance category to the compliance module 108, may pass online posts that are assigned to the inquiry category to the inquiry module 110, and pass online posts that are assigned to the opinion category to the sentiment analysis module 112. As discussed above, the same post may be passed to more than one analysis module when the post is assigned to more than one category.

Referring back to FIG. 2, as discussed above, the online post 202 is assigned to the compliance category, and as such, the categorization module 106 may pass the online post 202 to the compliance module 108. According to various embodiments of the disclosure, the compliance module 108 may perform one or more analyses on the online post 202 and may perform one or more actions in response to the online post 202 based on the analyses. In some embodiments, the compliance module 108 may first determine whether the potential transaction inferred from the online post 202 is in violation to policies of the entity. The compliance module 108 may perform a keyword search on the text data 204 and may also perform image recognition algorithms on any image data included within the online post 202. For example, if it is in violation of the entity's policy to use a service provided by the entity in a transaction that involves, pharmaceutical or illicit drugs, pornography, and electronic cigarettes, the compliance module 108 may determine whether the text data 204 includes one or more of the keywords "drug," "pharma," "pharmaceutical," "porn," "nude," "e-cig," etc., and determine whether the image data included in the online post 202 is related to any one of these products. In this example, the compliance module 108 may conclude that the online post 202 is related to a potential transaction for selling drugs, which is in violation to the entity's policies, based on the presence of the words "drugs" and "sale" within the same phrase in the text of the online post 202.

Once it is determined that the online post 202 is related to a potential transaction in violation of the entity's policies, the compliance module 108 of some embodiments may determine a user account with the service provider server 102 (the seller account) that is used for selling drugs on the social media. In some embodiments, the compliance module 108 may determine the seller account based on information related to the user account 204 with the social media server (e.g., the social media server 130). It is noted that a user may likely use identical (or very similar) user names across multiple platforms and entities, and so the user name (or handle name) being used with the social media server 130 may be identical or substantially similar to a user name being used with the seller account. Thus, the compliance module 108 may search through the accounts database 116 to identify a user account with the service provider server 102 having a user name identical or substantially similar to the user name (also referred to as "handle name" herein) 204 'JasonM34.' In some embodiments, the compliance module 108 may also scrap online posts generated by the user account 204 'JasonM34' on the social media server 130 to extract additional information, such as residence location of the user, contact information of the user, purchase history of the user, locations that the user has recently visited, etc., to assist the user account risk assessment module 208 to identify the seller account with the service provider server 102 that corresponds to the user account 204 'JasonM34' with the social media server 130.

As shown in FIG. 2, in addition to the text, the online post 202 also includes a link 206 for directing viewers to a website 210. In this example, the link 206 includes a web address 208 'www.paypal.com/abc.' In some embodiments, the compliance module 108 may examine the web address 208 from the link 206, and may determine that the web address 208 is associated with the entity and the service provider server 102 based on the domain name appears in the web address 208. By examining the web address and/or examining the content within the website 210, the compliance module 108 may also determine that the web address points to the website 210 for users to make payments to a user account having a handle name 'Jmorales34' with the service provider server 102. In this regard, the compliance module 108 may transmit the web address 208 to the web server 114 to pull information related to the website 210 from the web server 114. While the user name 'Jmorales34' is not identical to the user name 204 'JasonM34,' the compliance module 108 may still conclude that the user name 'Jmorales34' is associated with the seller account used to sell drugs via the online post 202 based on the connection between the user name 'Jmorales34' and the online post 202, and the similarity between the user names 'Jmorales34' and 'JasonM34.'

After identifying the seller account, the compliance module 108 may implement additional restrictions on the seller account to prevent the potential transaction from occurring. For example, the compliance module 108 may deactivate the seller account for a predetermined duration of time, denying any transaction request (e.g., a payment transaction request) generated by the seller account, and/or impose a maximum transaction limit on the seller account for a predetermined duration of time. This way, the seller associated with the user name 'JasonM34' would not be able to make inappropriate transactions using the service offered by the entity for at least a duration of time. The compliance module 108 may also transmit a notification to the seller account based on contact information listed in the accounts database 116 associated with the seller account, notifying the seller of his or her violation of the entity's policies.

In addition to identifying the seller account, the compliance module 108 of some embodiments may also identify one or more buyer accounts with the service provider server 102 that are associated with potential buyers in the potential transaction. For example, when it is detected that one or more users of the social media server 130 responds to the online post 202 (for example, based on the social media feeds continuously retrieved from the social medial server 130), the compliance module 108 may use information related to those users of the social media server 130 (e.g., using the handle name of the posters who responded to the online post 202, etc.) to identify one or more buyer accounts with the service provider server 102, in a similar manner as described above in identifying the seller account. Once the buyer accounts are identified, the compliance module 108 may also impose restrictions on the buyer accounts, such as deactivating the buyer accounts for a predetermined duration of time or imposing a maximum transaction limit for a predetermined duration of time. In some embodiments, the restrictions imposed on the buyer accounts are less restrictive than the restrictions imposed on the seller account. For example, only a maximum transaction amount is imposed on the buyer accounts while the seller account is deactivated, or the duration of the restriction is shorter for the buyer accounts than the duration of the seller account.

In addition to implementing restrictions on the seller accounts and/or the buyer accounts, the compliance module 108 of some embodiments may also work with the web server 114 to prevent the potential transaction based on the online post 202. In some embodiments, after receiving the link 206 from the compliance module 108, the web server 114 may be configured to redirect any HTTP requests for the web address 208 to another website 212 different from the website 210 so that other users who intended to complete the potential transaction based on the online post 202 by clicking on the link 206 would be prevented from completing the transaction. The redirected website 212 may include a message indicating that the transaction that the user wants to complete is being denied. After the reconfiguration of the web server 114, a user making an HTTP request based on the web address 208, for example by clicking on the link 206 from the user computer 120, would be redirected to the website 212. Since the service provider server 102 may retrieve feeds of online posts in real-time, the service provider server 102 may immediately respond to posts that may trigger potential transactions that are in violation of the entity's policies, and may effectively prevent the potential transactions from occurring.

Furthermore, the compliance module 108 may also send the post 202 and additional information derived from the post 202, as discussed above, to a database within the service provider server 102 such that another team within the entity may examine the post 202 further.

Referring to FIG. 3, as discussed above, the online post 302 is assigned to the inquiry category, and as such, the categorization module 106 may pass the online post 302 to the inquiry module 110. According to various embodiments of the disclosure, the inquiry module 110 may perform one or more analyses on the online post 302 and may perform one or more actions in response to the online post 302 based on the analyses. As shown in FIG. 3, the online post 302 includes a user name 304 'JasonM34' associated with a user of the social media server (e.g., the social media server 130) who generated the posted 302. The online post 302 also includes content 306 generated by the user account 304. In some embodiments, the compliance module 108 may first determine a product or a service that the user 304 is having a problem with, by analyzing the content 306. The inquiry module 110 may perform a keyword search on the content 306 when the content includes text data, and may also perform image recognition algorithms on any image data included within the content 306, to determine whether the content 306 indicates a product or a service offered by the entity that the user seems to have a problem with. In this example, by performing a keyword search, the inquiry module 110 may determine that the content 306 of the online post 302 includes the name of the entity 'PayPal' and also the name of a service 'Payment Service' offered by PayPal. As such, the inquiry module 110 may conclude that the online post 302 is related to the service 'Payment Service,' and retrieve, from the web server 114 resources related to the 'Payment Service." For example, the inquiry module 110 may retrieve from the web server 114 a web address for a website that addresses the 'Payment Service' (e.g., a frequently asked questions website for the Payment Service such as http://www.paypal.com/help/pay_services). In some embodiments, a user account with each of the various social media servers 130, 132, and 134 may be established for the entity. The inquiry module 110 may then generate a response to the post 302 by including the web address in the response, and post the response to the social media server 130 under the user account of the entity. FIG. 3 illustrates a response 308 that includes the web address being posted on the social media server 130 as a response to the online post 302 generated by the user 304.

According to various embodiments of the disclosure, in addition to providing the initial response to the online post 302, the inquiry module 110 may continue to monitor activities related to the online post 302, and may provide additional follow-up responses based on the monitored activities. In some embodiments, the inquiry module 110 may instantiate a new instance of a bot for each of the online posts it needs to monitor. The bot may function as an instance of the inquiry module 110 but provide functionalities only with respect to a specific online post. For example, when it is detected that the user 304, via user computer 120, generated a follow-up post (may be in response to the response 308 generated by the inquiry module 110) related to the online post 304, the bot may analyze the follow-up post by the user 304 and generate follow-up responses to assist the user 304.

For example, the user 304 may generate a follow-up post, in response to the response 308, by further explaining the user's problems with using the Payment Service, the solution of which is not found in the frequently asked question section of the website. Thus, the bot may provide additional information in an attempt to solve the problems of the user 304. In this regard, the bot (an instance of the inquiry module 110) may use one or more machine learning algorithms to provide context within the conversation between the user 304 and the bot. The machine learning algorithms may help the bot to analyze the follow-up post(s) generated by the user 304 to understand if the user wants information on something more specific within the service, wants information on something broader within the service, or wants information about a different aspect of the service. The bot may then use the context derived from the follow-up posts to query the web server 114 for different resources to provide to the user 304. Again, the bot may generate additional responses that include the resources retrieved from the web server 114, and post the additional responses to the social media server 130.

In some embodiments, the inquiry module 110 may send information related to the post 302 to the sentiment analysis module 112 to derive a sentiment of the post and/or a sentiment trend of the post and the follow-up posts generated by the user 304. By determining a sentiment of the user 304, the inquiry module 110 may provide improvements in the responses by modifying the response (e.g., providing additional words or phrases) based on the sentiment of the user 304. For example, if the sentiment analysis module 112 determines that the user 304 is frustrated, the inquiry module 110 (or the bot) may add phrases such as "we are sorry that you are frustrated," "thank you for being patient," etc. when generating the responses to the post 302. In addition, as the inquiry module 110 continues to feed new data related to the online post 302 (e.g., new follow-up posts from the user 304) to the sentiment analysis module 112, the sentiment analysis module 112 may also determine a sentiment trend of the user 304 over the conversation with the inquiry module 110. As such, the inquiry module 110 may also modify a response to the follow-up post based on the determined sentiment trend. For example, when it is determined that the sentiment of the user 304 is trending downward (e.g., getting more and more frustrated), the inquiry module 110 may transmit a notification to a user device 310 associated with a human customer service representative 312 with the entity. The notification may include a link to the online post 302 and information derived from the online post 302 previously by the inquiry module and the sentimental analysis module 112 (e.g., the sentiment and sentiment trend of the user 304, information related to the user 304, etc.) so that the human customer representative 312 may use the user device 310 to further communicate with the user 304, possibly via the online post 302. The techniques in determining a sentiment and a sentiment trend based on information of a post are described in more detailed below.

Furthermore, the inquiry module 110 may also send the post 302 and additional information derived from the post 302, as discussed above, to a database within the service provider server 102 such that another team within the entity may examine the post 302 further.

As discussed above, in addition to being assigned to the inquiry category, the online post 302 is also assigned to the opinion category, and as such, the categorization module 106 may also pass the online post 302 to the sentiment analysis module 112. According to various embodiments of the disclosure, the sentiment analysis module 112 may perform one or more analyses on the online post 302 and may perform one or more actions in response to the online post 302 based on the analyses. In some embodiments, the sentiment analysis module 112 may accumulate multiple online posts that are assigned to the opinion category, for example, accumulating online posts that are assigned to the opinion category over a period of time (e.g., several hours, weeks, months, etc.). In some of these embodiments, the sentiment analysis module 112 may examine the each of the accumulated online posts to extract a related topic for the online post (for example, based on a keyword search in the content of the online post), and may then further categorize the online posts based on the extracted topic. In some embodiments, the sentiment analysis module 112 may determine that the online posts are related to a topic when a frequency of one or more keywords related to the topic appear in the online posts exceeds a predetermined threshold.

For example, the sentiment analysis module 112 may determine a first group of online posts that are related a new product being released recently by the entity, as the examination of the content of the online posts indicate that the online posts within this group include expressions of opinions (e.g., like, dislike, etc.) regarding the new product (e.g., the online posts in this group include the name of the new product). The sentiment analysis module 112 may also determine a second group of online posts that are related to a service that has been offered by the entity, as the examination of the content of these online posts indicate that the online posts within this group include expressions of opinions regarding the service (e.g., the online posts in this group include the name of the service).

In some embodiments, the sentiment analysis module 112 may then analyze the online posts in each group to derive an overall sentiment of the public regarding the topic extracted from the online posts in this group. When analyzing an online post, the sentiment analysis module 112 may determine a sentiment of the post based on word(s) being used in the post. For example, the sentiment of a post is determined to be positive if the post includes positive words such as "like," "fond of," "awesome," "great," etc. and the sentiment of the post is determined to be negative if the post includes negative words such as "dislike," "hate," "sucks," etc. In addition, the sentiment analysis module 112 may determine a sentiment of the post based on the use of punctuation marks and/or capitalization. It can be observed that the amount of certain punctuation marks such as '!' and '?' and the capitalization of words indicates a heightened intensity of a sentiment. As such, if it is determined that the online post includes a positive word with a lot of exclamation marks, the sentiment analysis module 112 may determine a high degree of positive sentiment for the post, (a higher degree than that of another post with positive words without exclamation marks). Similarly, if it is determined that the online post includes a negative word with a lot of exclamation marks, the sentiment analysis module 112 may determine a high degree of negative sentiment for the post, (a higher degree than that of another post with negative words without exclamation marks).

In one embodiment, semantic or word analysis of the online post is based on the user who made the post. For example, the user may typically post in all capital letters, use exclamation points, and/or use certain expressive language. In that case, presence of such content may be weighed or treated differently than another user who does not normally use such punctuation or language in online posts. This then may result in a different sentiment between users, even though the punctuation and/or language of the posts are similar, where the post from the first user may be determined as neutral, while the post from the second user may be determined as angry or negative. By adjusting the analysis based on the specific user, more accurate sentiments may be obtained for both individuals and groups.

By analyzing each of the online posts in the first group, the sentiment analysis module 112 may determine an overall sentiment for the topic related to the first group. For example, the sentiment analysis module 112 may determine an average sentiment based on the sentiments determined for the online posts in the first group. In another example, the sentiment analysis module 112 may generate statistics based on the determined sentiments of the online posts in the first group, such as a percentage of online posts that are positive regarding the new product, a percentage of online posts that are negative regarding the new product, etc. In some embodiments, the sentiment analysis module 112 may also capture a frequency of online posts that are related to the topic to determine the overall sentiment for the group. For example, the sentiment analysis module 112 may increase an intensity of the overall sentiment when a frequency of online posts is above a predetermined threshold, and may reduce the intensity of the overall sentiment when the frequency is below the predetermined threshold.

The sentiment analysis module 112 may also determine a cause to the determined overall sentiment. By analyzing the content of the posts that indicate a negative sentiment of the product, the sentiment analysis module 112 may determine that many users are frustrated with a particular feature of the product. The sentiment analysis module 112 may then retrieve online resources related to that particular feature (e.g., from the web serve 114) and may automatically respond to the online posts with a link to a retrieved resource (e.g., a website comprising a user manual for the particular feature).

In some embodiments, the sentiment analysis module 112 may continue to accumulate online posts from the social media servers 130, 132, and 134 for the different extracted topics, and generate a sentiment trend for each of the topic. For example, the first group of online posts related to the new product may be accumulated during a first period of time. The sentiment analysis module 112 may then accumulate new online posts related to the new product generated during a second period of time subsequent to the first period of time. The sentiment analysis module 112 may then determine an overall sentiment for the online posts accumulated in each of the two periods, and then derive a sentiment trend based on the overall sentiments determined for the two periods. The sentiment analysis module 112 may continue to accumulate more online posts related to the new product in subsequent periods of time to add to the sentiment trend. For example, if the overall sentiment determined for the first period is slightly negative and the overall sentiment determined for the second period is slightly positive, the sentiment analysis module 112 may determine that the overall sentiment is trending upward.

The sentiment analysis module 112 may then store the sentiment information in a database, and may present the sentiment information in a report for each topic. For example, the sentiment analysis module 112 may generate a report that indicates the overall sentiment information for online posts related to the new product and may automatically transmit the report to the product manager. The report may include the overall sentiment of the online posts related to the new product, the sentiment trend (e.g., a change of the sentiment over periods of time), and other sentiment information derived by the sentiment analysis module 112.

In some embodiments, the sentiment analysis module 112 may also track any events related to the topic that occurred when the overall sentiment for the topic changes. For example, the sentiment analysis module 112 may identify a release of a new version of the product between the first period of the time and the second period of time. The sentiment analysis module 112 may then correlate the sentiment shift (trend) to the event of releasing the new version. In another example, when the sentiment analysis module 112 determines that the online posts having negative sentiment are related to a recent publication published by the entity, the sentiment analysis module 112 may automatically remove the publication from the Internet, for example, by removing the webpage that includes the publication from the web server 114. The sentiment analysis module 112 may also generate a follow-up publication (e.g., a press release) based on the publication.

This information may also be included in the report presented to the manager. As a result of correlating the upward sentiment trend to the release of the new version of the product, the sentiment analysis module may automatically release a public announcement of the new version of the product to promote the new version, for example, by generating an online post and uploading the online post to the various social media servers 130, 132, and 134 under the entity's accounts. The sentiment analysis module 112 may also instruct a manufacturing facility of the entity to scale up a production of the new version of the product. The sentiment analysis module 112 may also automatically respond to the accumulated posts determined to have a negative sentiment toward the product with the online post including information about the new version of the product.

In some embodiments, the extracted topic of a group of online posts may not be related to a specific product or a specific service offered by the entity, but instead, related to a campaign associated with the entity. For example, the group of online posts may be related to a campaign to boycott the entity. The sentiment analysis module 112 may determine a frequency of such online posts and may automatically transmit an alert to a user device of a manager of the entity when the frequency of the posts related to the campaign exceeds a predetermined threshold.

Furthermore, the sentiment analysis module 112 may also send the post 302 and additional information derived from the post 302, as discussed above, to a database within the service provider server 102 such that another team within the entity may examine the post 302 further.

Figure 4:
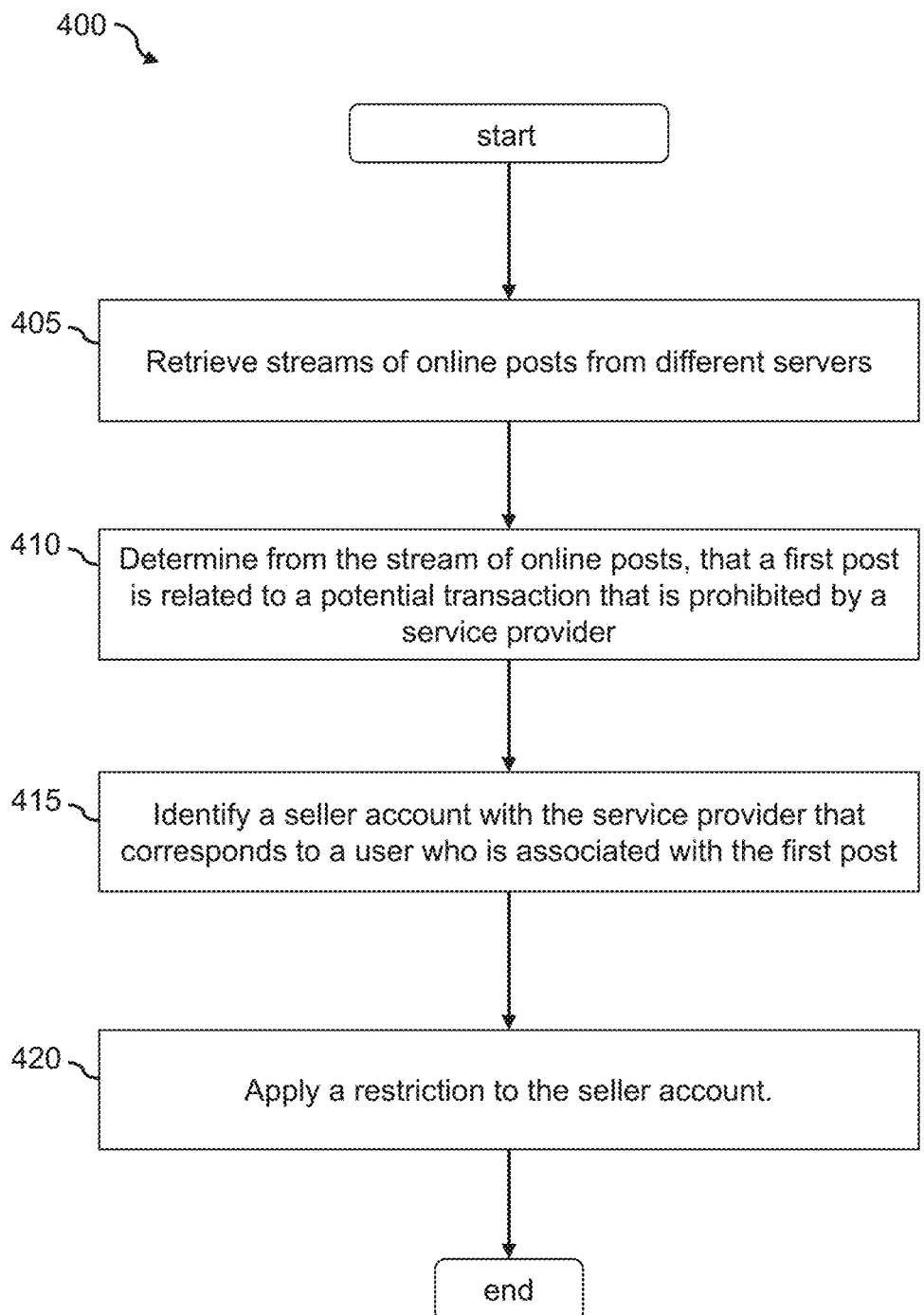
FIG. 4 is a flowchart showing a process of analyzing online posts to prevent prohibitive transactions according to an embodiment of the present disclosure.

FIG. 4 illustrates a process 400 for analyzing online posts to prevent transactions that violate an entity's policy according to an embodiment of the disclosure. In some embodiments, the process 400 may be performed by the compliance module 108. The process 400 begins with retrieving (at step 405) streams of online posts from different servers. For example, the service provider server 102 may use the streaming API module 104 to retrieve streams of online posts from the social media servers 130, 132, and 134. In another embodiment, content from the posts may be scraped, in real-time, by the streaming API module 104. As used herein, retrieving can include scraping content from the online posts.

The process 400 then determines (at step 410) that a first post from the streams of online posts includes content related to a potential transaction that is prohibited by the entity. For example, the compliance module 108 may perform a keyword search and/or an image recognition algorithm on the content of the online post to determine whether the online post is related to a potential transaction that is in violation of the entity's policy. When it is determined that the first post is related to a prohibited transaction, the process 400 identifies (at step 415) a seller account with the service provider server 102 corresponding to a seller in the potential transaction. For example, the compliance module 108 may analyze the user name of the poster of the first online post to determine the seller account with the service provider server 102. The compliance module 108 may also scrape social media data associated with the poster to retrieve additional information of the poster, such as a residence address, contact information, a purchase history etc., and may use this information to identify the seller account within the accounts database 116. In some embodiments, when the first post includes a link to a website associated with the service provider server 102 (e.g., a webpage for facilitating a payment to the seller account), the compliance module 108 may also analyze the link to determine whether the link indicates a user account with the service provider server 102, and may conclude that the user account is the seller account of the seller in the potential transaction.

Once the seller account is identified, the process 400 may apply (at step 420) one or more restrictions on the seller account. For example, the compliance module 108 may deactivate the seller account for a predetermined period of time or impose a maximum transaction limit on the seller account for a predetermined period of time, such that the seller is no longer able to use the seller account to complete the potential transaction. In addition, the compliance module 108 may also configure the web server 114 to redirect the link to another website of the entity such that potential buyers who wish to complete a transaction with the poster of the first online post may no longer use the link to complete the transaction.

Figure 5:
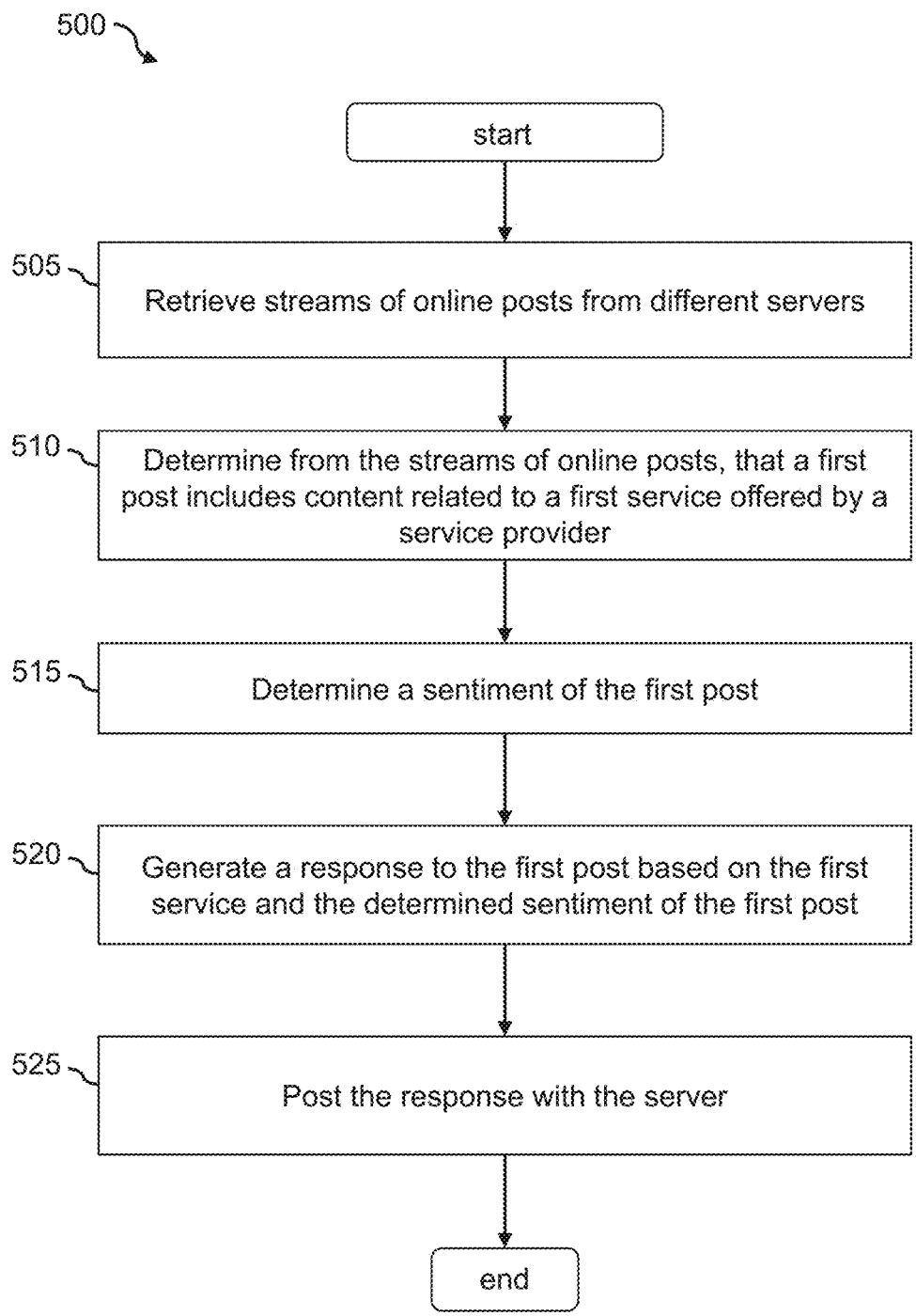
FIG. 5 is a flowchart showing a process of analyzing online posts to provide automated assistance to users according to an embodiment of the present disclosure.

FIG. 5 illustrates a process 500 for analyzing online posts to provide automated assistance to users according to an embodiment of the disclosure. In some embodiments, the process 500 may be performed by the inquiry module 110 and the sentiment analysis module 112. The process 500 begins with retrieving (at step 505) streams of online posts from different servers. For example, the service provider server 102 may use the streaming API module 104 to retrieve streams of online posts from the social media servers 130, 132, and 134. In another embodiment, the streaming API module 104 scrapes content from the online posts in real time, thereby eliminating the need to retrieve the online posts. The process 500 then determines (at step 510) that a first post from the streams of online posts includes content related to a product or a service offered by the entity. For example, the inquiry module 110 may perform a keyword search and/or an image recognition algorithm on the content of the online post to determine whether the online post is related to a particular product or a service offered by the entity.

Once it is determined that the first online post is related to a product or a service of the entity, the process 500 determines (at step 515) a sentiment of the first post. For example, the sentiment analysis module 112 may analyze the semantics (words, punctuations, phrases, etc.) of the first online post to determine a sentiment for the first post. The determined sentiment may indicate a positive or a negative sentiment. In some embodiments, the determined sentiment may also include an intensity of the sentiment.

The process 500 then generates (at step 520) a response to the first post based on the related product or service and the determined sentiment of the first post. For example, the inquiry module 110 may retrieve an online resource related to the product or service indicated in the first post (e.g., a frequently asked question webpage for the product or service) and may include a link to the online resource in the response. Based on the sentiment of the first post, the sentiment analysis module 112 may modify the response, for example, by adding phrases such as "thank you for your patience" to the response. The process 500 then posts (at step 525) the response with the server from which the first online post was retrieved.

Figure 6:
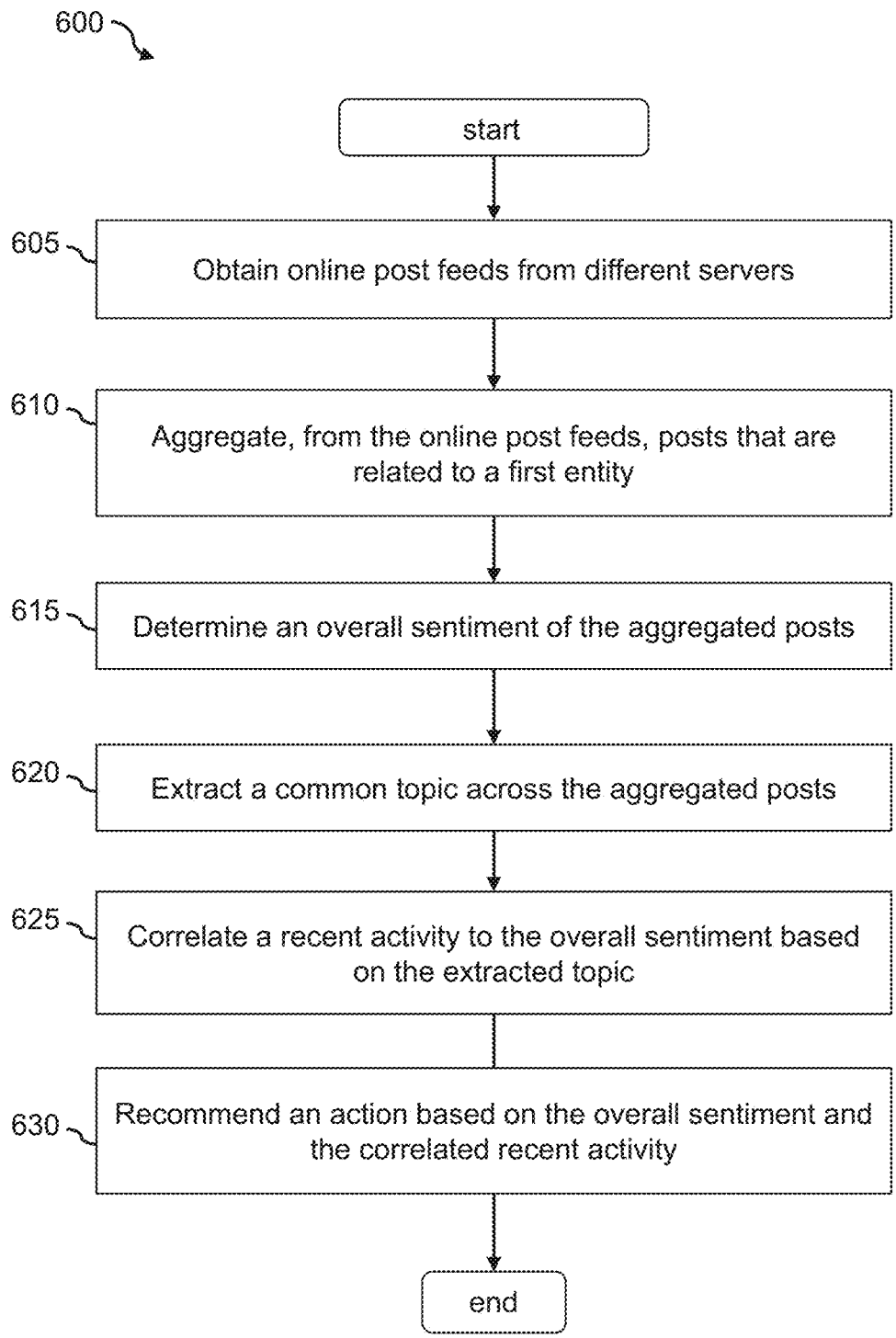
FIG. 6 is a flowchart showing a process of determining a sentiment of the public regarding an entity according to an embodiment of the present disclosure.

FIG. 6 illustrates a process 600 for determining a sentiment of the public regarding an entity by analyzing online posts according to an embodiment of the disclosure. In some embodiments, the process 600 may be performed by the sentiment analysis module 112. The process 600 begins with obtaining (at step 505) or scrape content from online post feeds from different servers. For example, the service provider server 102 may use the streaming API module 104 to obtain or scrape content from online post feeds from the social media servers 130, 132, and 134. The process 600 then aggregates (at step 610), from the feeds, online posts or content that are related to an entity or an aspect of the entity. For example, the sentiment analysis module 112 may perform keyword search and/or image recognition algorithm on the content of the online posts to determine if the online post is related to the entity or a product or a service offered by the entity. As discussed above, the sentiment analysis module 112 may then aggregate the online posts that are related to the same entity (or same product or service) into a group.

The process 600 then determines (at step 615) an overall sentiment of the aggregated posts. For example, the sentiment analysis module 112 may analyze the semantics (e.g., choice of words, choice of punctuations, etc.) of each online post to determine a sentiment for the online post. The sentiment analysis module 112 may then determine an overall sentiment of the aggregated posts based on the sentiments determined for each post in the group. In some embodiments, the sentiment analysis module 112 may use an average sentiment computed based on all the sentiments determined for the aggregated posts as the overall sentiment.

At step 620, the process 600 extracts a common topic across the aggregated posts. For example, the sentiment analysis module 112 may determine that most of the posts (e.g., over 50% or some other threshold) having negative sentiment toward the product discuss a specific feature of the product. The process 600 then correlates (at step 625) a recent activity from the entity to the overall sentiment based on the extracted topic. For example, the sentiment analysis module 112 may identify a release of a new version of the product that adds the specific feature to the product prior to the aggregated posts being obtained. The sentiment analysis module 112 may then correlate the release of the new version to the overall negative sentiment toward the product.

The process then recommends (at step 630) an action based on the overall sentiment and the correlated recent activity. For example, after correlating the release of the new version to the overall negative sentiment toward the product, the sentiment analysis module 112 may recommend a release of a newer version to improve that specific feature of the product. In some embodiments, the sentiment analysis module 112 may also automatically retrieve an article describing the feature and how to use the feature (e.g., from the web server 114), and automatically post the article on the social media servers 130, 132, and 134. In addition, the sentiment analysis module 112 may also respond to the negative posts about the feature with the article as well.

Figure 7:
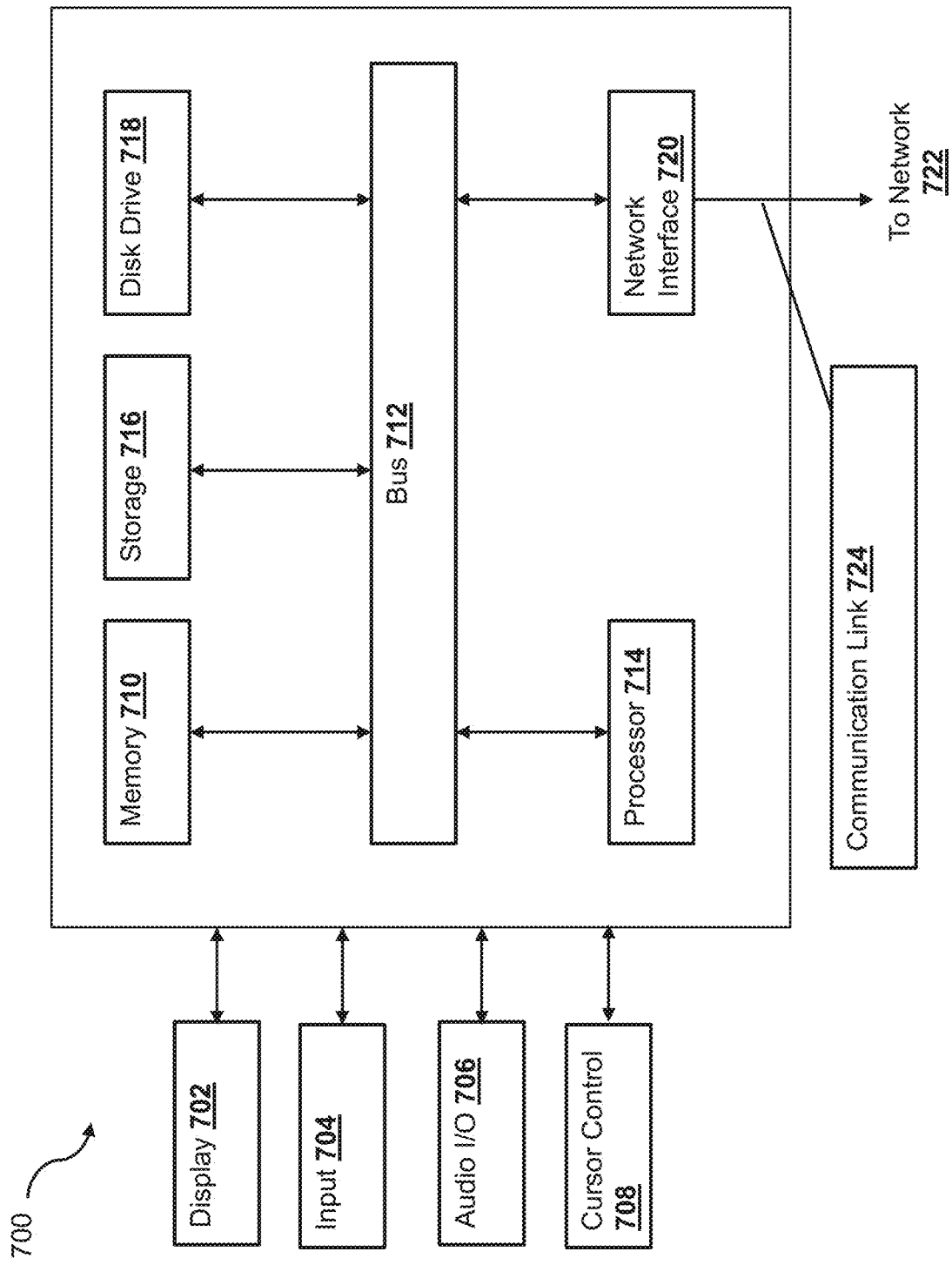
FIG. 7 is a block diagram of a system for implementing a device according to an embodiment of the present disclosure.

FIG. 7 is a block diagram of a computer system 700 suitable for implementing one or more embodiments of the present disclosure, including the service provider server 102, the social media servers 130, 132, and 134, and the user device 120. In various implementations, the user device 120 may include a mobile cellular phone, personal computer (PC), laptop, wearable computing device, etc. adapted for wireless communication, and each of the service provider server 102 and the social media servers 130, 132, and 134 may include a network computing device, such as a server. Thus, it should be appreciated that the devices 102, 130, 132, 134, and 102 may be implemented as computer system 700 in a manner as follows.

Computer system 700 includes a bus 712 or other communication mechanism for communicating information data, signals, and information between various components of computer system 700. Components include an input/output (I/O) component 704 that processes a user (i.e., sender, recipient, service provider) action, such as selecting keys from a keypad/keyboard, selecting one or more buttons or links, etc., and sends a corresponding signal to bus 712. I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. Audio I/O component 706 may allow the user to hear audio. A transceiver or network interface 720 transmits and receives signals between computer system 700 and other devices, such as another user device, a social media server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on computer system 700 or transmission to other devices via a communication link 724. Processor 714 may also control transmission of information, such as cookies or IP addresses, to other devices.

Components of computer system 700 also include a system memory component 710 (e.g., RAM), a static storage component 716 (e.g., ROM), and/or a disk drive 718 (e.g., a solid state drive, a hard drive). Computer system 700 performs specific operations by processor 714 and other components by executing one or more sequences of instructions contained in system memory component 710. For example, processor 714 can perform the functionalities described herein according to the processes 400, 500, and 600.

Logic may be encoded in a computer readable medium, which may refer to any medium that participates in providing instructions to processor 714 for execution. Such a medium may take many forms, including but not limited to, non-volatile media, volatile media, and transmission media. In various implementations, non-volatile media includes optical or magnetic disks, volatile media includes dynamic memory, such as system memory component 710, and transmission media includes coaxial cables, copper wire, and fiber optics, including wires that comprise bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A method comprising:
obtaining, by one or more hardware processors associated with a payment service provider, content of an online post feed from a server via a network, wherein the online post feed comprises online posts generated by different users registered with the server;

examining, by the one or more hardware processors, the content of the online posts from the online post feed;

determining, by the one or more hardware processors based on the examining, that a first online post from the online posts is related to a payment transaction that violates one or more policies of the payment service provider, wherein the first online post includes a link for a first payment web page associated with the payment service provider and a user account with the payment service provider;

receiving, by the one or more hardware processors from a user device, a web request for the first payment web page based on a detected selection of the link of the first online post; and in response to receiving the web request and the determining, redirecting, by the one or more hardware processors, the user device to a second web page associated with the payment service provider that is different from the first payment web page, wherein the second web page is not associated with the user account.

2. The method of claim 1, further comprising:
identifying the user account with the payment service provider associated with the first post; and
applying one or more restrictions to the user account.

3. The method of claim 1, further comprising generating a report indicating that the user account is associated with the payment transaction that violates the one or more policies of the payment service provider.

4. The method of claim 2, wherein the identifying the user account comprises analyzing a web address associated with the link.

5. The method of claim 1, further comprising causing the first online post to be removed from a website of the server.

6. The method of claim 1, wherein the determining that the first online post is related to the payment transaction that violates the one or more policies of the payment service provider particular transaction typo comprises determining a keyword that appears in the first online post.

7. The method of claim 1, wherein the online post feed is a social media feed, and wherein the server comprises a social media server.

8. A system comprising:
a non-transitory memory; and
one or more hardware processors coupled with the non-transitory memory and configured to read instructions from the non-transitory memory to cause the system to perform operations comprising:
retrieving an online post feed from a website via a network, wherein the online post feed comprises online posts generated by different users registered with the website;
analyzing content of the online posts from the online post feed;
determining, based on the analyzing, that a first online post from the online posts is related to a payment transaction that violates one or more policies of a payment service provider, wherein the first online post includes a link for a first payment web page associated with the payment service provider and a user account with the payment service provider;
receiving, from a user device, a web request for the first payment web page based on a selection of the link; and in response to receiving the web request and the determining, redirecting the user device to a second web page associated with the payment service provider that is different from the first payment web page, wherein the second web page is not associated with the user account.

9. The system of claim 8, wherein the online posts comprise text data, and wherein the analyzing the content of the online posts comprises performing a keyword analysis on the text data of the online posts.

10. The system of claim 8, wherein the online post comprises image data, and wherein the analyzing the content of the online post comprises extracting text data from the image data using an optical character recognition algorithm on the image data of the online posts.

11. The system of claim 8, wherein the operations further comprise:
identifying the user account with the payment service provider that is associated with the first online post based on the link; and
configuring the user account based on a transaction threshold limit.

12. The system of claim 8, wherein the operations further comprise generating a report indicating that the first user account is associated with the payment transaction that violates the one or more policies of the payment service provider.

13. The system of claim 8, wherein the operations further comprise causing the link to be removed from the website.

14. The system of claim 8, wherein the identifying the user account comprises analyzing a web address of the link.

15. The system of claim 8, wherein the identifying the user account comprises:
extracting a handler name associated with a poster of the first online post; and
analyzing the handler name.

16. The system of claim 8, wherein the operations further comprise:
receiving a transaction request associated with the user account; and
denying the transaction request based on the user account being associated with the first online post.

17. A non-transitory machine-readable medium having stored thereon machine-readable instructions executable to cause a machine to perform operations comprising:
retrieving an online post feed from a website via a network, wherein the online post feed comprises online posts generated by different users registered with the website;
analyzing content of the online posts from the online post feed;
determining, based on the analyzing, that a first online post from the online posts is related to a payment transaction that violates one or more policies of a payment service provider, wherein the first online post includes a link for a first payment web page associated with a payment service provider and a user account with the payment service provider;
receiving, from a user device, a web request for the first payment web page based on a selection of the link; and
in response to receiving the web request and the determining, redirecting the user device to a second web page associated with the payment service provider that is different from the first payment web page, wherein the second web page is not associated with the user account.

18. The non-transitory machine-readable medium of claim 17, wherein the operations further comprise:
   identifying the user account with the payment service provider that is associated with the first online post; and
   deactivating the first user account.

19. The non-transitory machine-readable medium of claim 17, wherein the identifying the user account comprises analyzing a web address of the link.

20. The non-transitory machine-readable medium of claim 17, wherein the identifying the user account comprises:
   extracting a handler name associated with a poster of the first online post; and
   analyzing the handler name.

\* \* \* \* \*

UNITED STATES PATENT AND TRADEMARK OFFICE
CERTIFICATE OF CORRECTION

PATENT NO. : 10,853,803 B2  
APPLICATION NO. : 15/802303  
DATED : December 1, 2020  
INVENTOR(S) : Bolla et al.

Page 1 of 1

It is certified that error appears in the above-identified patent and that said Letters Patent is hereby corrected as shown below:

In the Claims

Column 19, Line 41 should read:  
provider comprises determining a

Column 20, Line 25 should read:  
comprise generating a report indicating that the user Column 21, Line 5 should read:  
deactivating the first account.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*